United States Patent [19]

Austin et al.

[11] Patent Number: 4,564,537

[45] Date of Patent: Jan. 14, 1986

[54] PROCESS FOR DEPOSITING A SILICA COATING ON A METAL SURFACE

[75] Inventors: Frederick D. Austin, Weybridge; Peter Watson, Epsom, both of England

[73] Assignee: The British Petroleum Company p.l.c., London, England

[21] Appl. No.: 692,706

[22] Filed: Jan. 18, 1985

[30] Foreign Application Priority Data

Jan. 21, 1984 [GB] United Kingdom ............... 8401636

[51] Int. Cl.$^4$ ............................................. B05D 3/02
[52] U.S. Cl. ............................. 427/376.4; 427/239; 427/376.5; 427/397.7
[58] Field of Search ............... 427/376.4, 376.5, 397.7, 427/239; 428/450, 469, 702; 106/287.34; 423/335, 339

[56] References Cited

U.S. PATENT DOCUMENTS

| | | | |
|---|---|---|---|
| 2,408,654 | 10/1946 | Kirk | 106/287.34 |
| 3,013,897 | 12/1961 | Cupery et al. | 428/450 |
| 3,013,898 | 12/1961 | Dempcy | 106/287.34 |
| 3,133,829 | 5/1964 | Cupery et al. | 427/379 |
| 4,487,815 | 12/1984 | Dorsett et al. | 428/450 |

FOREIGN PATENT DOCUMENTS

| | | | |
|---|---|---|---|
| 54-114441 | 9/1979 | Japan | 427/397.7 |
| 56-15470 | 2/1981 | Japan | 427/397.7 |

*Primary Examiner*—S. L. Childs
*Attorney, Agent, or Firm*—Morgan, Finnegan, Pine, Foley & Lee

[57] ABSTRACT

Silica may be deposited on metal surfaces e.g. on heat exchanger surfaces to reduce undesirable deposits by the following aqueous process. Finely divided moist silicic acid of defined particle size is mixed with hot (e.g. at least 98.5° C.) pure water for not more than 1 hour. The mixture is subjected to depolymerization by heating at specified pH so as to depolymerize substantially all the silica. The resulting aqueous silica is then passed over the surface to be coated at temperature above 80° C. so as to deposit a hard bound silica coating.

10 Claims, No Drawings

PROCESS FOR DEPOSITING A SILICA COATING ON A METAL SURFACE

The present invention relates to the deposition of silica coatings on metals.

It is known to apply coatings of silica to metal surfaces to protect them. Thus International patent application No. 79/00247 discloses the coating of substrates eg steel, with a sol of a refractory material eg silica. A silica sol is applied to the surface to be treated, is dried, to convert it to a gel, which is then heated to a relatively high temperature to give the desired coating.

The specification shows that a less dense coating is obtained at 500° C. than at 700° or 870° C. There is an example which shows the coating of mild steel with silica sol at 200° C. No details are provided of the performance of the silica layer obtained at a temperature of 200° C. However as the process uses a sol containing colloidal particles, one would expect that high temperatures would be needed to sinter the colloidal particles together if the production of high porosity layers is to be avoided.

It will be difficult to control the thickness of the coating obtained because this will depend on the thickness of the sol layer which is dried and may also depend on the size of the colloidal silica particles which may vary. Thicker layers would require multiple coating and drying steps which would increase the cost.

U.S. Pat. No. 3,013,397 (Cupery et al) also discloses the formation of a protective coating on a metal surface. The coating is applied by treatment with an aqueous dispersion of an organic film former and colloidally dispersed silica particles. The coating is dried and then heated to remove the film former and to coalesce the silica particles. Typical temperatures are 400°–600° F. (204°–316° C.).

This process uses colloidal silica particles, with the disadvantages (increased porosity and difficulty in regulating coating thickness) already indicated. The film former is presumably added in an attempt to promote the linking together of the individual colloidal silica particles. Coalescence of the silica particles to form a layer does not mean that the spaces between the particles will be filled up so as to eliminate porosity. Very high temperatures would be required to do this.

U.S. Pat. No. 3,133,829 (Cupery et al) discloses the protection of metal surfaces by coating the metal with a colloidal dispersion in a carrier eg water. The metal surface is covered with a film of sol, dried and then heated to at least 500° F. (260° C). Heating to at least 1200° F. (649° C.) is required for coatings of reduced porosity. This agrees with the disclosure of WO 79/00247, that high temperatures are required for low porosity coatings. Porosity is not a desirable characteristic for a protective coating.

As in the other patent specifications discussed above it is not easy to regulate the thickness of the coating.

In processes which involve depositing a layer of colloidal silica particles, drying at 200°–350° C. only removes free water from surface. The rest of the layer will still consist of substantially discrete particles with pores between them. It will often not be possible to use higher temperatures. Thus in treating the surfaces of mild steel heat exchangers, temperatures above 400° C. may affect the integrity of the joints in the exchanger.

U.S. Pat. No. 2,913,419 (Alexander) discloses a process for making particles coated with silica. The coating may be carried out by adding simultaneously a material described as "active silica" and a solution containing ions of a metal to be deposited on the metal. Although the presence of "active silica" and metal ion is said to be necessary, the specification states that if the "active silica" is introduced first it will be deposited without the metal.

The "active silica" is said to be a very low molecular weight species, which may be added as such or may be formed in situ by the addition of acid to a soluble silicate.

However because the method of preparing the "active silica" involves the use of a soluble sodium silicate, the active silica will contain metal ions.

The term "active silica" is said to include not only monomeric silica, but also certain polymeric forms capable of depolymerisation under suitable conditions.

The specification states that the active silica is prepared at ordinary temperatures and that ageing or heating to elevated temperature polymerises the "active silica".

The reaction to give the silica coating preferably takes place at 95°–100° C.

This specification teaches the formation of "active silica" at normal ambient temperatures and the formation of a silica coating from the "active silica" at a higher temperature.

The specification insists on the use of a material having a surface area of at least one square meter per gram as the support for the silica layer. It is concerned with forming coatings on powders and not with forming protective coatings on continuous metal surfaces.

The disclosure of U.S. Pat. No. 2,885,366 (Iler) is very similar to that of U.S. Pat. No. 2,913,419).

U.S. Pat. No. 2,731,326 (Alexander et al) describes the preparation of "active silica" and its use to produce reinforced reticulated structures, by an accretion process. In the accretion process the pH is maintained at 8–11, and the alkali metal ion concentration is kept low. Temperatures of 60° to 125° C. are used.

U.S. Pat. No. 2,577,484 (Rule) discloses the production of a salt-free sol of active silica which is used to increase the size of particles in a silica sol by heating at over 60° C. eg 100° C. at a pH of 7.5 to 10.7. In these specifications, as in U.S. Pat. No. 2,913,419 "active silica" is formed at ambient temperature and is used at higher temperatures.

According to the present invention the process for depositing a silica coating on a metal surface comprises
(1) a mixing step of mixing finely divided moist silicic acid having a particle size distribution such that not more than 10% by weight has a particle size in excess of 3 millimeters with hot pure water over a period of not more than 1 hours,
(2) a depolymerisation step of heating the mixture at a temperature above 95° C., and a pH of 4–6, the quantity of moist silicic acid, and the duration of the heating step being so chosen that at the end of the depolymerisation step substantially all the silica is depolymerised to active silica and after the depolymerisation step,
(3) a coating step of passing the aqueous silica over the metal surface to be coated while maintaining the solution at a temperature above 80° C. for a time sufficient to deposit the desired thickness of a hard bound silica coating but not sufficient to cause formation of a substantial amount of loosely bound gel.

THE MIXING STEP

Moist silica acid as used in the process of the present invention is a free flowing particulate solid containing a major amount of water. For example one commercially available material contains 16% by weight of silica. Examples of typical silica contents are those in the range 13–20% by weight.

The moist silica acid used has a particle size distribution such that not more than 10% by weight, preferably not more than 5% by weight, most preferably with substantially no particles having a particle size greater than 3 mm. If the particle size distribution as supplied by the manufacturer does not meet this requirement it is possible to grind the moist silicic acid to reduce its particle size. However care must be exercised in any grinding or high speed mixing operation, particularly in the presence of water as the amount of material not susceptible to depolymerisation may be increased. It is preferred to use moist silicic acid which has the desired particle size distribution in the form supplied by the manufacturer.

The moist silicic acid is mixed with hot pure water in the initial mixing step. The water is most preferably above 95° C., ;eg at least 98.5° C. The purity of the water is important as if the water is insufficiently pure undesirable polymerisation reactions will be promoted. The water is most desirably of such a purity that it has a conductivity of not more than 50 micro Siemens at 20° C. preferably a conductivity of 10–25 micro Siemens. The pH is preferably in the range 6.1–6.3 at 20° C. In general deionised water is not very satisfactory because of its residual content of organic matter. Distilled water or water of equivalent purity is desirable.

THE DEPOLYMERISATION STEP

Pure water is used in the mixing step, and moist silicic acid contains no significant quantities of metal ions. The presence of metal ions is undesirable and the pH of the solution in the depolymerisation step is preferably the natural pH of the solution which will usually be in the range 4–6.

The temperature of the depolymerisation step is critical. If the initial heating step is carried out at temperatures significantly below 95° C. the silica will begin to polymerise to high molecular weight gel which will prevent substantially all the moist silica acid being depolymerised to active silica, which is required for the production of a tightly bound coating. It is preferred to use temperatures above 98.5° C. Temperatures above 100° C. can be used if the water is maintained under superatmospheric pressure.

The quantity of moist silicic acid used is such that substantially all the silica can be converted into active silica within 16 hours. The maximum concentration of active silica which can be obtained is about 550 ppm at 99° C. Any excess silica will tend to form the less coherent gel mentioned above. The quantity of moist silicic acid is preferably selected so as to give a silica concentration in the water of not more than 550 ppm, preferably not more than 400 ppm.

The duration of the heating step may vary over a moderately wide range depending on the concentration of silica in the water and may for example be 6–16 hours.

The degree of depolymerisation of the silica may be determined by the analytical technique described below. Whatever the method of following the degree of depolymerisation which is used, the silica is considered to be substantially depolymerised for the purposes of the present invention when it has a degree of depolymerisation corresponding to substantially complete depolymerisation as measured by the analytic method described below.

The analytical method used to determine the "active silica" and hence the degree of depolymerisation is a modification of the Garrett-Walker method described in the Analyst, 642, 89, 1964.

10 ml of 0.5M sodium molybdate solution is diluted in the volume ratio 1:19 with distilled water to give solution (A). 10 ml of 2M hydrochloric acid is diluted in the volume ratio of 1:19 with distilled water to give solution (B).

40 ml each of solutions (A) and (B) are mixed and 5 ml of the sample to be tested in then added. The mixture is left for 40 minutes to develop colour. It is then diluted to 400 ml with distilled water. A reference using 5 ml of distilled water in place of 5 ml of sample. The absorbance is measured in 1 cm cells at 329 m$\mu$ using a uv-visible Perkin Elmer 5505 Spectrophotometer and multiplied by 8.

The test was calibrated using as standard aqueous solutions of sodium metasilicate in 0.005M sodium hydroxide. The concentration of these solutions was calculated on the basis of an analysis showing that sodium metasilicate contains 29.9% weight silica. For the purposes of these calibrations it was assumed that all the silica was present as "active silica" as described in Garret and Walker, Analyst, 642, 89, 1964.

THE COATING STEP

When substantially all the silica has depolymerised it is then passed over the surface to be coated.

The surface to be coated may for example be a metal. Examples of metals to which the process of the present invention may be applied are mild steel, ferrous and non-ferrous alloys. The surfaces to be coated with silica are desirably free from any contaminants which will impair adhesion of the coating. Thus metal surfaces will generally be degreased before being subjected to the process of the present invention. The surfaces to be treated may be corroded provided that the corrosion has not proceeded so far as to affect the integrity of the surface to be treated, or may already have a deposit of fouling.

The solution passed over the surface to be coated must be maintained at a temperature of at least 80° C. At temperatures below 80° C. the coating is undesirably thin.

The upper temperature limit will normally be 100° C. unless super atmospheric pressures are used.

The duration of the coating step is determined by the coating thickness required and may for example be 6 to 24 hours, more preferably 18 to 24 hours. The rate of flow of aqueous silica over the surface is preferably such as to give turbulent flow over the surface. An examples of a suitable flow rate is 0.05 m$^3$/hr (50 liters/hr) for a tube with 8 mm nominal bore. The flow rates are preferably such as to give Reynold's numbers in the range 6000–10000.

The skilled person will be able to determine whether a substantial amount of gel has been formed by simple visual inspection and/or by brushing the coated surface and observing whether loosely bound material is removed. In theory the formation of the loosely bound gel will not adversely affect any firmly bonded layer already deposited and will merely result in a loss of silica as waste. In practice however it will not usually be practicable to brush off or otherwise remove the loosely bound material from the interior surfaces of for example heat exchangers. For this reason any substantial amount of gel is absent.

USES OF THE INVENTION

The present invention is particularly useful for depositing anti-fouling coatings on surfaces which in use are kept hot while in contact with liquids e.g. heat exchangers. When heat exchangers are used to heat for example crude oil or other liquids containing high boiling organic components a solid deposit, which may contain organic and/or inorganic materials, may form on the heated surface. This fouling of the surface will impair the heat transfer properties of the heat exchanger and may lead to blockages in the heat exchangers which further impair their operation. This fouling of heated surfaces as a result of deposition from liquids in contact with the surface should be distinguished from corrosion of the surface itself. The process of the present invention is particularly useful for applying anti-fouling coatings for heat exchangers.

The invention will now be further described by reference to the following examples.

EXAMPLE

The apparatus used consisted of an open stainless steel vessel provided with means for heating and stirring and a thermometer for measuring the temperature of the contents. The contents of the vessel could be passed through polychloroprene tubes to a test section consisting of a length of tube to be coated and from there by way of a second thermometer and a rotameter for measuring liquid flow back to the stainless steel vessel. The test section used was a 2 feet (610 mm) long 8 mm nominal bore seamless mild steel tube. It was pre-treated by abrasion with a proprietary abrasive material (sold under the name of "Scotchbrite") and then degreased with organic solvents.

The stainless steel vessel was filled with distilled water having a conductivity of 10–25 $\mu$s at 20° C. and a pH of 6.1–6.3 at 20° C. The water was heated to 99° C. and stirred gently.

Commercially available moist silicic acid having a maximum particle size of 3 mm, and a total silica content of about 16% by weight, was added directly to the vessel. The quantity of moist silicic acid added was sufficient to give a total silica concentration in solution of 400 pmm. The pH of the solution was not controlled and was in the range 4–6.

The temperature of the solution was maintained at 99° C. while stirring gently for 8 hours.

The concentration of "active silica" was measured by the method described above. At the end of 8 hours the concentration of "active silica" was found to be substantially the same as the total silica content i.e. the silica had substantially completely depolymerised.

The solution was then fed through the test section at a rate controlled to give $R_E=8100$ in the tube. The temperature of the solution leaving the test section was maintained at 98° C. Solution was pumped through the tube for 18 hours.

The test section was then removed and examined. It was found that a thin continuous, hard bound silica layer 0.25 $\mu$m thick had been formed on the interior of the tube.

A mild steel pipe with an internal silica coating prepared as described as above was tested to compare the fouling resulting from heating crude oil.

Tests were carried out using apparatus as described in GB 1564757, hereafter referred to as the SFR (Sunbury Fouling Rig).

The conditions used were

| Feed: | Kuwait crude oil |
|---|---|
| Flow rate: | 30 1/hr (0.03 m$^3$/hr) |
| Tube temperature: | 315° C. |

Tests were also carried out using the JFTOT apparatus as described in ASTM Test D-3241-74T.

| Feed: | Kuwait crude oil |
|---|---|
| Flow rate: | 0.25 1/hr |
| Tube temperature: | 280° C. |

Fouling results were obtained for untreated tubes compared with silica coated and untreated tubes without and with commercially available anti-fouling additives in quantities of 30 ppm.

The results are summarised in the Table.

TABLE

| Antifouling treatment | Comparative Reduction in crude oil fouling | |
|---|---|---|
| | JFTOT test | SFR test |
| Silica coating process of the invention | 74 | 97 |
| Commercial antifoulant A | 59 | 72 |
| Commercial antifoulant B | 56 | 56 |

The increased reduction in fouling resulting from the use of the process of the present invention is clearly shown by the above results.

We claim:

1. The process for depositing a silica coating on a metal surface comprises
   (1) a mixing step of mixing finely divided moist silicic acid having a particle size distribution such that not more than 10% by weight has a particle size in excess of 3 millimeters with hot pure water over a period of not more than 1 hour,
   (2) a depolymerisation step of heating the mixture at a temperature above 95° C., and a pH of 4–6, quantity of moist silicic acid, and the duration of the heating step being so chosen that at the end of the depolymerisation step substantially all the silica is depolymerised to active silica and, after the depolymerisation step,
   (3) a coating step of passing the aqueous silica over the metal surface to be coated while maintaining the solution at a temperature above 80° C. for a time sufficient to deposit the desired thickness of a hard bound silica coating but not sufficient to cause formation of a substantial amount of loosely bound gel.

2. The process according to claim 1 wherein the moist silicic acid contains 13–20% by weight of silica.

3. The process according to claim 1 wherein the moist silicic acid contains substantially no particles having a particle size greater than 3 mm.

4. The process according to claim 1 wherein the moist silicic acid is mixed with water at a temperature of at least 98.5° C.

5. The method according to claim 3 wherein the water is of such a purity that it has a conductivity in the range 10–25 micro-Siemens.

6. The method according to claim 1 wherein the depolymerisation step is carried out at a temperature above 98.5° C.

7. The method according to claim 3 wherein the quantity of moist silicic acid used is such as to give a silica concentration in the water of not more than 400 ppm.

8. The method according to claim 1 wherein the duration of the heating in the depolymerisation step is 6 to 16 hours.

9. The method according to claim 3 wherein the duration of the coating step is in the range 6 to 24 hours.

10. The method according to claim 3 wherein the rate of flow of aqueous silica over the metal surface is sufficient to give turbulent flow over the surface.

* * * * *